(12) United States Patent
Lee

(10) Patent No.: US 12,046,963 B2
(45) Date of Patent: Jul. 23, 2024

(54) HAIRPIN ALIGNMENT METHOD FOR HAIRPIN WINDING MOTOR

(71) Applicants: HYUNDAI MOTOR COMPANY, Seoul (KR); KIA CORPORATION, Seoul (KR)

(72) Inventor: Jaehwan Lee, Gimhae-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 50 days.

(21) Appl. No.: 17/536,658

(22) Filed: Nov. 29, 2021

(65) Prior Publication Data

US 2023/0028177 A1    Jan. 26, 2023

(30) Foreign Application Priority Data

Jul. 21, 2021    (KR) .................. 10-2021-0095792

(51) Int. Cl.
*H02K 15/04*    (2006.01)
*B21D 43/00*    (2006.01)

(52) U.S. Cl.
CPC ....... *H02K 15/0421* (2013.01); *B21D 43/003* (2013.01)

(58) Field of Classification Search
CPC ............ H02K 15/0421; H02K 15/064; H02K 15/0087; H02K 1/16; B21D 43/003
See application file for complete search history.

(56) References Cited

U.S. PATENT DOCUMENTS

| | | | |
|---|---|---|---|
| 10,396,638 B2* | 8/2019 | Noji | H02K 15/0031 |
| 11,005,346 B2* | 5/2021 | Matsumoto | H02K 15/06 |
| 11,218,061 B2* | 1/2022 | Metzger | B21D 39/03 |
| 11,522,423 B2* | 12/2022 | Dreher | H02K 1/12 |
| 11,527,945 B2* | 12/2022 | Dreher | H02K 15/0421 |
| 2006/0230607 A1* | 10/2006 | Even | H02K 15/064 29/760 |

(Continued)

FOREIGN PATENT DOCUMENTS

| | | | | |
|---|---|---|---|---|
| CN | 110768489 B | * | 12/2020 | .......... H02K 15/064 |
| JP | 2004-072839 A | | 3/2004 | |

(Continued)

*Primary Examiner* — Jeffrey T Carley
*Assistant Examiner* — Jose K Abraham
(74) *Attorney, Agent, or Firm* — MCDONNELL BOEHNEN HULBERT & BERGHOFF LLP

(57) ABSTRACT

A hairpin alignment device for the hairpin winding motor according to an embodiment includes a rotation unit in which the dummy core is mounted in the center and rotates the dummy core by a first predetermined angle in correspondence with the number of slots, an alignment unit disposed on the upper surface of the rotation unit, and including a plurality of push bars disposed along the upper end circumference of the dummy core and reciprocating in a radial direction with respect to the hairpin, a guide unit disposed on the side of the rotation unit, selectively operating with the hairpin overlapped in each layer when pre-aligning the hairpin to the slot, and moving the overlapping hairpin outward in a radial direction to secure an inserting space of the hairpin, and a handling gripper adjacent to the rotation unit and supplying the hairpin to the slot.

7 Claims, 14 Drawing Sheets

(56) References Cited

U.S. PATENT DOCUMENTS

| | | | | |
|---|---|---|---|---|
| 2009/0265909 A1* | 10/2009 | Guercioni | .......... | H02K 15/0428 |
| | | | | 29/426.2 |
| 2013/0104381 A1* | 5/2013 | Guercioni | .......... | H02K 15/0081 |
| | | | | 29/559 |
| 2013/0118222 A1* | 5/2013 | Guercioni | .............. | B21D 11/14 |
| | | | | 72/299 |
| 2016/0233749 A1* | 8/2016 | Ueno | ................... | H02K 15/067 |
| 2019/0356188 A1* | 11/2019 | Miyawaki | ................ | H02K 3/12 |
| 2020/0083761 A1* | 3/2020 | Luettge | ................ | H01F 41/082 |
| 2020/0177065 A1* | 6/2020 | Dreher | ..................... | H02K 1/16 |
| 2020/0195107 A1* | 6/2020 | Falkner | ............. | H02K 15/0037 |
| 2020/0313525 A1* | 10/2020 | Falkner | ............... | B21D 39/046 |
| 2020/0343797 A1* | 10/2020 | Takeda | ................ | H02K 15/064 |
| 2021/0152064 A1* | 5/2021 | Ruggieri | ............. | H02K 15/064 |

FOREIGN PATENT DOCUMENTS

| | | |
|---|---|---|
| JP | 8975891 B2 | 9/2007 |
| JP | 2013-165540 A | 8/2013 |

* cited by examiner

HAIRPIN ALIGNMENT METHOD FOR HAIRPIN WINDING MOTOR

CROSS REFERENCE TO RELATED APPLICATIONS

This application claims priority to and the benefit of Korean Patent Application No. 10-2021-0095792 filed in the Korean Intellectual Property Office on Jul. 21, 2021, the entire contents of which are incorporated herein by reference.

BACKGROUND

(a) Field

The present disclosure relates to a hairpin alignment device for a hairpin winding motor and a hairpin alignment method using the same. More particularly, the present disclosure relates to a hairpin alignment device for a hairpin winding motor capable of responding to various types of hairpin winding motors, and an alignment method using the same.

(b) Description of the Related Art

In a vehicle industry, R&D and commercialization of environment-friendly vehicle-related parts are actively being conducted in line with an international demand for enforcement of greenhouse gas reduction regulations and an improvement in fuel efficiency of vehicles.

Conventionally, by applying a drive motor with higher efficiency than an internal combustion engine, a technology of partially supporting the output of the internal combustion engine or replacing the internal combustion engine has been proposed.

In order to operate the drive motor, many additional devices such as an inverter, a battery, and an LDC (low direct converter) are required.

These additional devices take up a lot of space and have a significant weight.

Therefore, automakers and environment-friendly parts manufacturers are applying hairpins to the drive motors as a part of a technology development to reduce their weight and the volume.

In general, it is known that the output of the drive motor is proportional to the number of turns of the coil wound around the stator core.

However, if the number of turns of the coil is increased, the size of the stator core or the drive motor increases, which makes it difficult to down-size the drive motor.

Accordingly, in order to improve the output without increasing the size of the drive motor, a method of increasing a space factor of the coil wound around the stator core may be considered.

In other words, the space factor of the coil is increased by minimizing the dead space between the stator core and the coil being wound or each dead space between the coils.

In this context, instead of using an annular coil having a circular cross-section for the coil winding, a method of using a flat coil having a square cross-section is proposed.

The flat coil reduces the dead space and improves the space factor compared to the annular coil due to its cross-sectional shape.

On the other hand, in the case of the flat coil, there is relatively difficult winding work compared to the annular coil.

In the case of the above-noted flat coil, it is manufactured with a wider cross-section compared to the annular coil in order to maximize the space factor, and this is because the rigidity is increased and it is difficult to use a winding machine.

As a method for facilitating the coil winding of the flat coil, a method of inserting and engaging a plurality of separated hairpins into the stator core, respectively, and then sequentially welding and bonding each hairpin to form the coil winding has been proposed. These hairpins are made in a U-shape or V-shape.

The hairpin is composed of a pair of straight line conductors formed at both ends, a turn portion formed between the pair of straight line conductors, and a hairpin end formed by peeling an insulating coating of a certain section of the end of the pair of straight line conductors. The hairpin is mounted in such a way that a pair of straight line conductors are inserted into the slot of the core to be fixed, the upper part is exposed in the upper part of the stator core in the axial direction, and the turn part is exposed in the lower part of the stator core in the axial direction.

However, since the hairpins according to the conventional art have to be inserted one by one into the slot designated according to a predetermined pattern inside the stator core, it takes a lot of time to insert the hairpin.

The insertion method of the hairpin according to the conventional art not only delays the overall work process time, but also lowers the accuracy of the work process.

Therefore, it is necessary to research and develop a method to insert the hairpin into the stator core accurately and quickly.

The above information disclosed in this Background section is only for enhancement of understanding of the background of the disclosure, and therefore it may contain information that does not form the prior art that is already known in this country to a person of ordinary skill in the art.

SUMMARY

An embodiment of the present disclosure is to provide a hairpin alignment device for a hairpin winding motor and a hairpin alignment method using the same, which can respond regardless of a type of the stator core and the hairpin.

In one or a plurality of embodiments of the present disclosure, a hairpin alignment device for a hairpin winding motor of pre-aligning a plurality of hairpins inserted into a hairpin winding motor as at least one layer to a slot of a dummy core, includes a rotation unit in which the dummy core is mounted in the center and rotates the dummy core by a first predetermined angle in correspondence with the number of slots, an alignment unit disposed on the upper surface of the rotation unit, and including a plurality of push bars disposed along the upper end circumference of the dummy core and reciprocating in a radial direction with respect to the hairpin, a guide unit disposed on the side of the rotation unit, selectively operating with the hairpin overlapped in each layer when pre-aligning the hairpin to the slot, and moving the overlapping hairpin outward in a radial direction to secure an inserting space of the hairpin, and a handling gripper adjacent to the rotation unit and supplying the hairpin to the slot.

The rotation unit may include a rotation jig that clamps at least one mount block mounted along the lateral circumference of the dummy core and rotates the dummy core by a first predetermined angle, and a lower plate disposed under the lower part of the dummy core and pushing the hairpin pre-aligned to the slot upward from the dummy core.

The alignment unit may rotate by a first predetermined angle together with the dummy core by the rotation unit, and press the hairpin pre-aligned to the slot in the inside of the radial direction through a plurality of push bars to be positioned in a home position.

In addition, in the plurality of push bars, a contacting surface in contact with the hairpin may have a rounded shape.

A plurality of push bars may be positioned radially in the center of a ring-shaped guide plate mounted on the upper portion of the rotation unit, and cross each other so that the positions of the up and down directions are staggered.

The guide unit may include a guide bar positioned on the upper part of the dummy core and including one end being bent and positioned inside the radial direction of the hairpin, and the other end being connected to the rotation unit by a connection bracket, and a first driving unit mounted on the connection bracket to reciprocate the guide bar in the radial direction.

The guide bar may operate to secure the inserting space in the slot by moving the corresponding hairpin caught on a tip of one side while moving outward in the radial direction when the rotation unit rotates by a second predetermined angle.

A pressure unit disposed on the alignment unit and pressing the hairpin pre-aligned to the slot downward to be positioned in a home position may be further included.

The pressure unit may include a frame positioned adjacent to the rotation unit, and a pressure plate formed of a ring-shaped plate and slidably mounted on the frame by the second driving unit to be positioned on the upper center of the dummy core, and pressing the hairpins aligned to the slot while being reciprocally operated in the up-and-down direction by the third driving unit mounted on the second driving unit.

The hairpin alignment device for the hairpin winding motor and the hairpin alignment method using the same according to an embodiment of the present disclosure may respond to various types of the stator core and the hairpin, thereby reducing the initial design cost.

In addition, the hairpin alignment device for the hairpin winding motor and the hairpin alignment method using the same according to an embodiment of the present disclosure provide the insert space within the slot of the dummy core by the guide unit, thereby aligning the hairpin without interference.

Further, effects that can be obtained or expected from embodiments of the present disclosure are directly or suggestively described in the following detailed description. That is, various effects expected from embodiments of the present disclosure will be described in the following detailed description.

DETAILED DESCRIPTION

Figure 1:
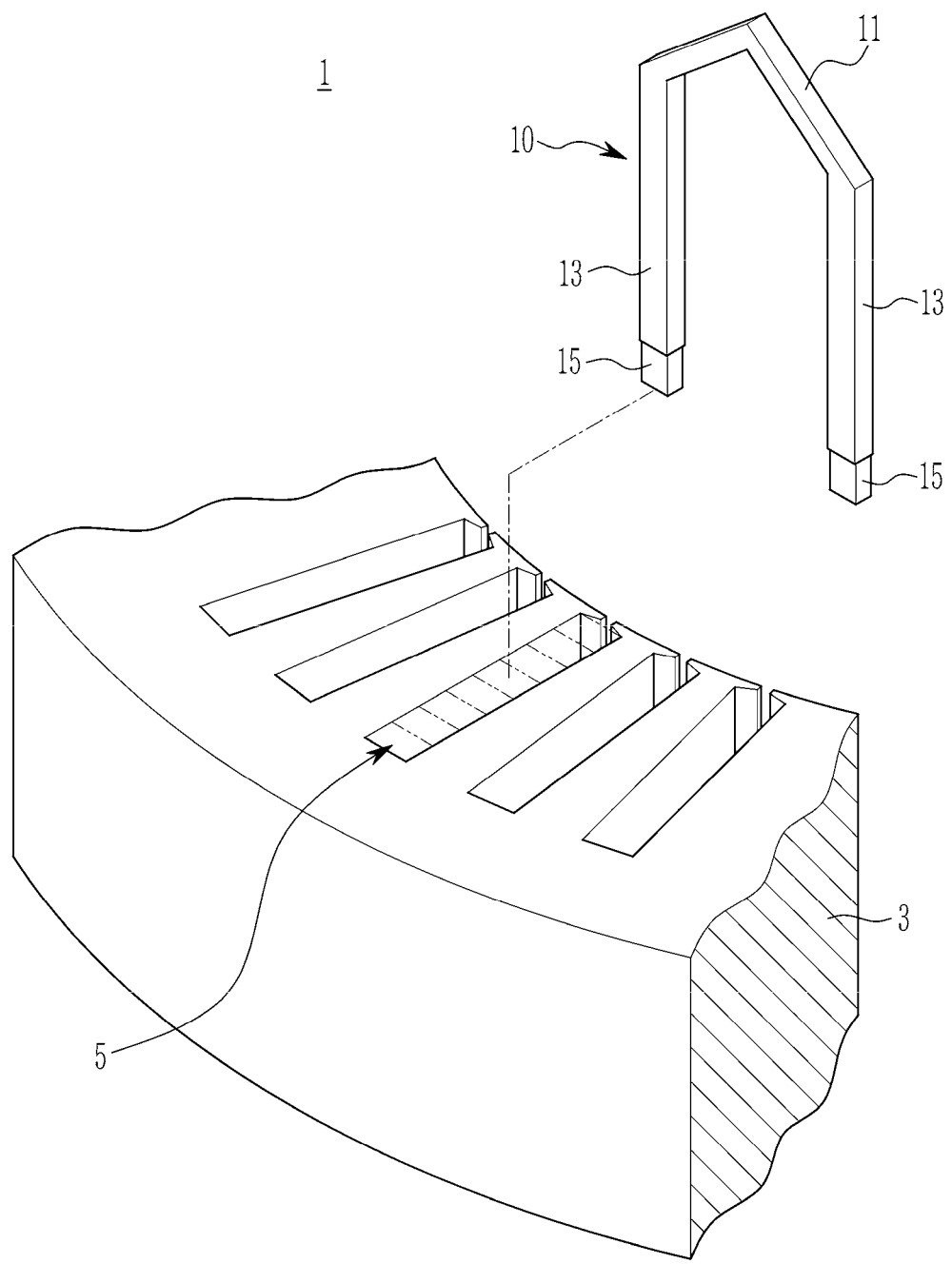
FIG. 1 is a view schematically showing a stator structure of a hairpin winding motor applied to an embodiment of the present disclosure.

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

Descriptions of parts not related to the present disclosure are omitted, and like reference numerals designate like elements throughout the specification.

Further, since sizes and thicknesses of constituent members shown in the accompanying drawings are arbitrarily given for better understanding and ease of description, the present disclosure is not limited to the illustrated sizes and thicknesses.

In a detailed description, in order to distinguish the same constituent elements, first, second, etc., are used in names of constituent elements and do not represent an order.

In addition, in the entire specification, unless explicitly described to the contrary, the word "comprise" and variations such as "comprises" or "comprising" will be understood to imply the inclusion of stated elements but not the exclusion of any other elements.

FIG. 1 is a view schematically showing a stator structure of a hairpin winding motor applied to an embodiment of the present disclosure.

Referring to FIG. 1, a stator 1 of a hairpin winding motor applied to an embodiment of the present disclosure may be applied to a drive motor of a hybrid vehicle or an electric vehicle obtaining a driving torque through electrical energy as an environment-friendly vehicle.

The drive motor includes a rotation element (not shown) disposed with a predetermined gap from the stator 1 and a plurality of permanent magnets (not shown) installed on the rotation element. The stator 1 includes a stator core 3 in which a plurality of electrical steel sheets are stacked. The hairpins 10 are wound through a plurality of slots 5 formed in the stator core 3. The hairpin 10 is made of a flat coil, and includes a head part 11 and a pair of leg parts 13 formed on respective sides based on the head part 11. The hairpin 10 is formed in a U-shape or a V-shape as a whole, and may be formed as a flat coil with a square cross-section. A plurality of hairpins 10 are inserted into a predetermined layer of the slot 5 in the stator core 3 (refer to a double-dot chain line shown in FIG. 1).

In the state that the hairpins 10 are inserted into the stator core 3, the de-coating part 15 formed at the end of a pair of leg parts 13 is protruded to the outside of the slot 5. The hairpins 10 may form a winding electrically connected by a welding joint of the de-coating part 15.

As described above, an embodiment of the present disclosure has been described as being applied to the stator 1 of the hairpin winding motor employed in an environment-friendly vehicle, but the scope of the present disclosure should not be construed as being limited thereto, and the technical idea of the present disclosure may be applied to the motor with the hairpin 10 of various types and uses.

The hairpin alignment device for the hairpin winding motor according to an embodiment of the present disclosure may be applied to be pre-aligned to the slot 21 of a separate dummy core before inserting the hairpin 10 as above into the slot 5 of the stator core of the hairpin winding motor. That is, the hairpin alignment device for the hairpin winding motor may be applied for clamping the pre-aligned hairpin 10 once to be inserted to the slot 5 of the stator core after pre-aligning the hairpin 10 to the slot 21 of the dummy core as at least one layer.

Figure 2:
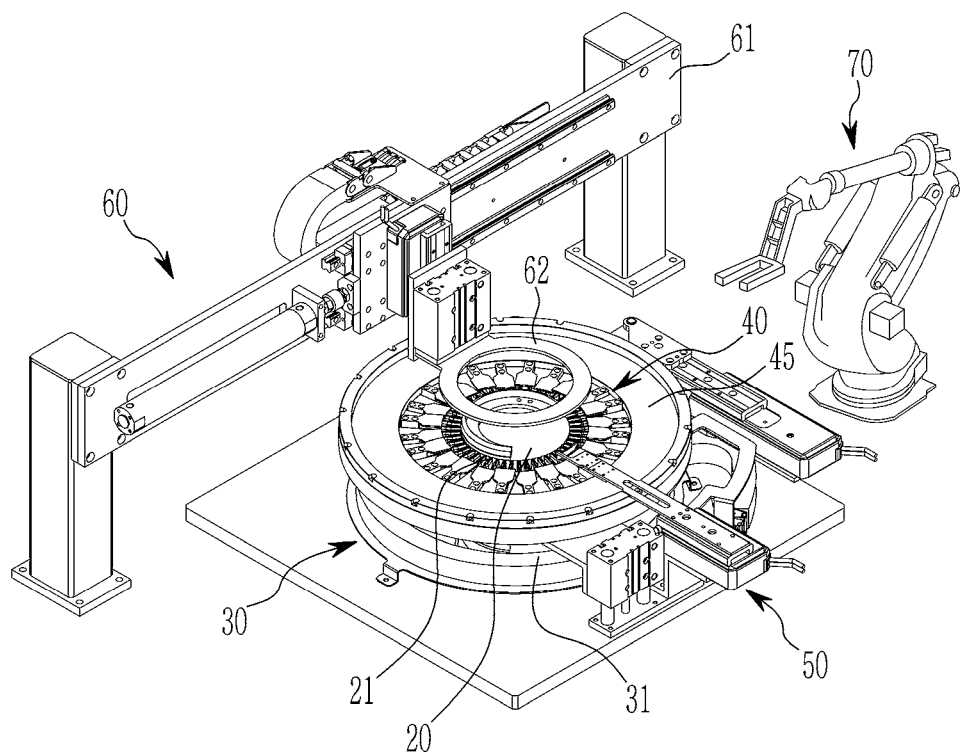
FIG. 2 is an entire perspective view of a hairpin alignment device for a hairpin winding motor according to an embodiment of the present disclosure.
Figure 3:
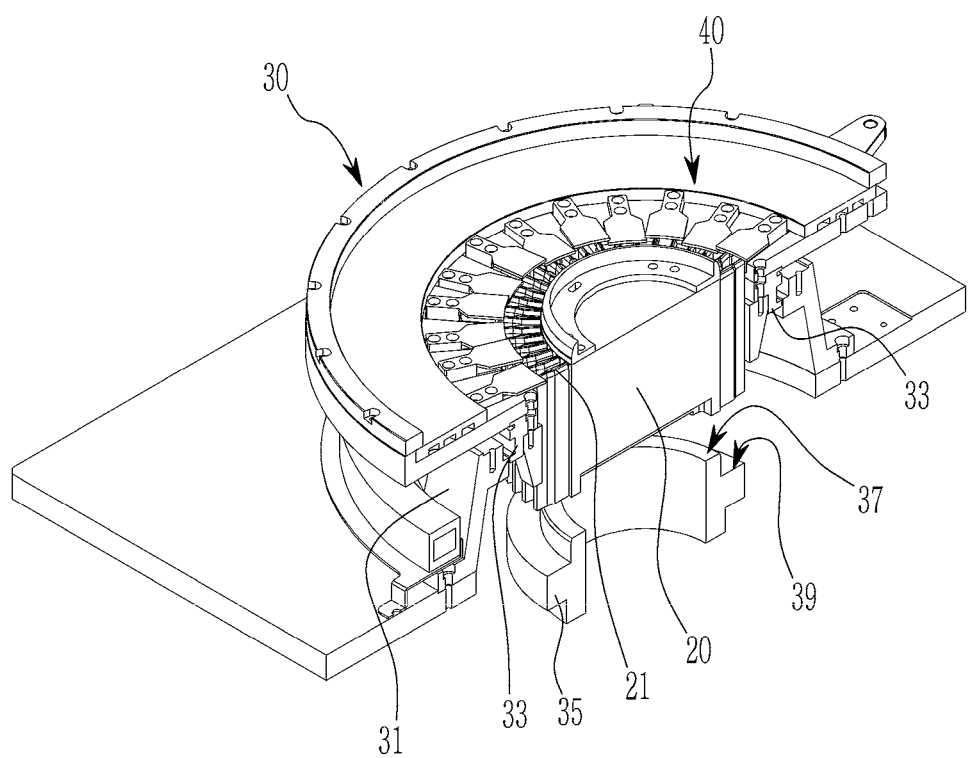
FIG. 3 is a schematic diagram for explaining a rotation unit applied to a hairpin alignment device for a hairpin winding motor according to an embodiment of the present disclosure.

FIG. 2 is an entire perspective view of a hairpin alignment device for a hairpin winding motor according to an embodiment of the present disclosure, and FIG. 3 is a schematic diagram for explaining a rotation unit applied to a hairpin alignment device for a hairpin winding motor according to an embodiment of the present disclosure.

Referring to FIG. 2, the hairpin alignment device for the hairpin winding motor includes a rotation unit 30, an alignment unit 40, a guide unit 50, a pressure unit 60, and a handling gripper 70. The hairpin alignment device for the hairpin winding motor is positioned so that the rotation unit 30, the alignment unit 40, and the guide unit 50 are connected to each other and overlapped. In addition, the pressure unit 60 is positioned to operate at the top of the rotation unit 30, the alignment unit 40, and the guide unit 50.

The handling gripper 70 may be disposed at a position adjacent to the rotation unit 30, the alignment unit 40, and the guide unit 50 to operate with respect to the rotation unit 30, the alignment unit 40, and the guide unit 50.

Referring to FIG. 3, in an embodiment of the present disclosure, the dummy core 20 is mounted in the center of the rotation unit 30. The rotation unit 30 rotates the dummy core 20 with the first predetermined angle corresponding to the number of slots 21 of the dummy core. That is, the first predetermined angle for rotating the dummy core 20 may be set according to the number of slots 21 of the dummy core.

For example, it is assumed that 48 slots 21 in the dummy core 20 are formed with the same interval in the circumferential direction, and the pitch between a pair of leg part 13 of the hairpin 11 is a 6-pitch hairpin inserted in every sixth slot 21.

In this case, the total of 48 hairpins are inserted into the slots 21 of the dummy core 20 to form one layer. In this case, the first predetermined angle may be 7.5 degrees (48/360).

The rotation unit 30 includes a rotation jig 31 and a lower plate 35. The rotation jig 31 is connected to the dummy core 20 by clamping at least one mount block 33 mounted along the lateral circumference of the dummy core 20. That is, at least one mount block 33 is configured between the rotation jig 31 and the dummy core 20, and the dummy core 20 is mounted on the rotation jig 31 via the mount block 33.

At this time, the dummy core 20 has a structure composed of a radial partition. The number of slots 21 of the dummy core may be the same as the number of slots 5 of the stator core. Accordingly, the specification of the dummy core 20 may be set according to the specification of the stator core 3 of the hairpin winding motor.

In addition, it is desirable to design the slot 21 of the dummy core larger than the size of the slot 5 of the corresponding stator core. The lower plate 35 is disposed under the dummy core 20. The lower plate 35 pushes the hairpin 10 pre-aligned to the slot 21 of the dummy core to the upper side of the dummy core 20. This lower plate 35 is approximately formed in a cylindrical shape with a hollow center, and the upper contact terminal 37 that is in contact with the dummy core 20 is formed at the top.

The lower plate 35 includes a lower contact terminal 39 stepped downward from the upper contact terminal 37, and the lower contact terminal 39 is in contact with the hairpin 10 inserted into the slot 21 of the dummy core. In other words, the lower contact terminal 39 protrudes outwardly in the radial direction from the body of the lower plate 35.

While the lower plate 35 operates in an up-and-down direction, the lower contact terminal 39 pushes the hairpin 10 upward from the dummy core 20. Accordingly, the distance between the upper contact terminal 37 and the lower contact terminal 39 may be formed corresponding to the protruded length of the hairpin 10 inserted into the slot 21 of the dummy core and protruded to the lower end of the dummy core 20. In some embodiments, the lower plate 35 may only be operated when necessary.

Figure 4:
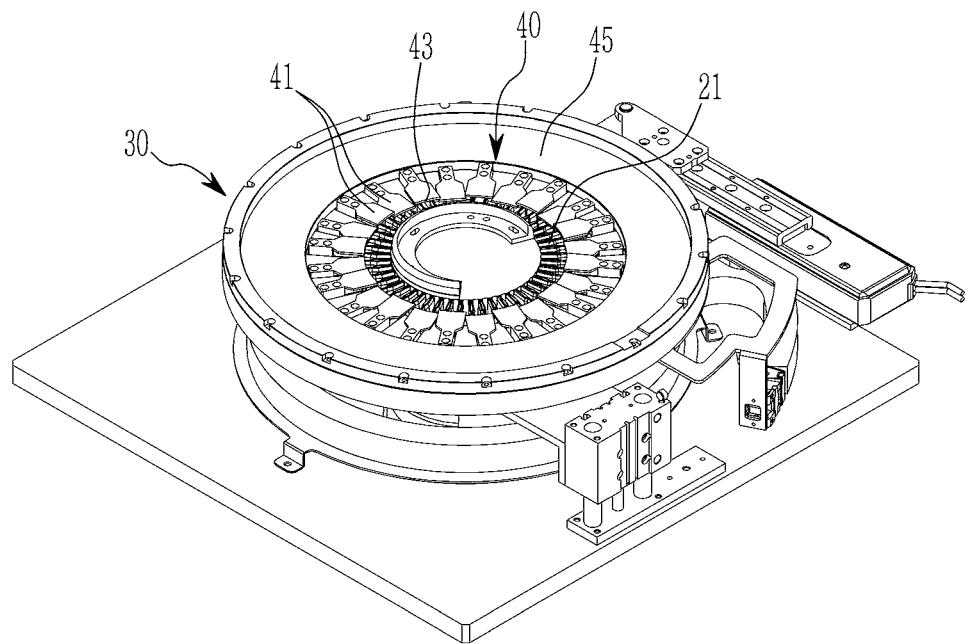
FIG. 4 is a schematic diagram for explaining an alignment unit applied to a hairpin alignment device for a hairpin winding motor according to an embodiment of the present disclosure.

FIG. 4 is a schematic diagram for explaining an alignment unit applied to a hairpin alignment device for a hairpin winding motor according to an embodiment of the present disclosure.

Referring to FIG. 4, in an embodiment of the present disclosure, the alignment unit 40 is disposed at the upper surface of the rotation unit 30. The alignment unit 40 is rotated with the dummy core 20 by the first predetermined angle by the rotation unit 30. The alignment unit 40 includes a plurality of push bars 41 disposed along the upper end circumference of the dummy core 20. The plurality of push bars 41 are configured to be reciprocated in the radial direction with respect to the hairpin 10. That is, the plurality of push bars 41 align the hairpin 10 inserted into the slot 21 of the dummy core by pressing it in the radial direction. In this case, the plurality of push bars 41 may have a rounded shape with the contacting surface 43 contacting the hairpin 10.

The plurality of push bars 41 are radially disposed in the center of the ring-shaped guide plate 45 mounted on the rotation unit 30. The plurality of push bars 41 may be disposed so that the upper and lower direction positions of the adjacent push bars 41 cross each other. Since the push bars 41 are gathered simultaneously in the side of the radial direction, they are disposed to cross each other so that the positions of the upper and lower directions are staggered, thereby avoiding mutual interference.

Figure 5:
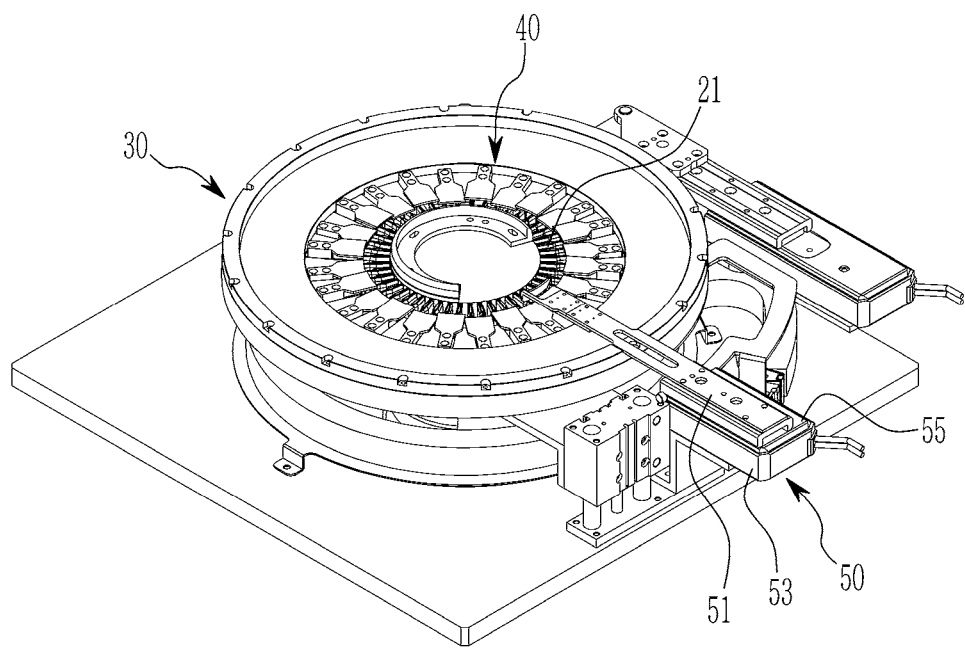
FIG. 5 is a schematic diagram for explaining a guide unit applied to a hairpin alignment device for a hairpin winding motor according to an embodiment of the present disclosure.

FIG. 5 is a schematic diagram for explaining a guide unit applied to a hairpin alignment device for a hairpin winding motor according to an embodiment of the present disclosure.

Referring to FIG. 5, in an embodiment of the present disclosure, the guide unit 50 is disposed on the side of the rotation unit 30. The guide unit 50 may be selectively operated on the hairpin 10 overlapping in each layer during the pre-alignment of the hairpin 10 to the slot 21 of the dummy core.

In the specification of the present disclosure, in the slot 21 of the dummy core, the layer aligned one turn on the innermost portion in the radial direction along the circumference of the dummy core 20 is referred to as a first layer, the layer aligned one further turn to the outside of the radial direction of the first layer is referred to as a second layer, and the layer aligned one further turn to the outside of the radial direction of the second layer is defined as a third layer.

When forming a plurality of layers by using the hairpin 10, an overlapping portion inevitably occurs as the hairpins 10 are pre-aligned to the slot 21 of the dummy core. At this time, when the hairpin 10 starts to be overlapped, the guide unit 50 operates.

The guide unit 50 moves the overlapping hairpins 10 outward in the radial direction to secure an insert space for each hairpin 10 within the slot 21 of the dummy core 20. To this end, the guide unit 50 includes a guide bar 51 extending in the radial direction of the dummy core 20. The guide bar 51 is positioned on the dummy core 20. One end of the guide bar 51 (or the inner end of the radial direction of the dummy core) is bent and disposed inside the radial direction of the hairpin 10, and the other end (or the outer end of the radial direction of the dummy core) is connected to the rotation unit 30 by the connection bracket 53.

When the rotation unit 30 rotates by a second predetermined angle, the guide bar 51 moves outward in the radial direction of the dummy core 20, and moves the hairpin 10 caught at the tip of the guide bar 51 outward in the radial direction, and thus the insert space may be secured within the slot 21 of the dummy core.

Here, the second predetermined angle refers to the angle at which the dummy core 20 rotates before the currently inserted hairpin 10 interferes with the first inserted hairpin 10 when each layer (e.g., the first layer to the third layer) is formed.

For example, when the 48 slots 21 in the dummy core 20 are formed with the equal interval in the circumferential direction and the 6-pitch hairpin is used, all 48 hairpins are inserted into the 48 slots 21 to form the layer. At this time, the 42nd hairpin 10 from the first inserted hairpin 10 in the slot 21 does not interfere with others. However, the 43rd inserted hairpin 10 interferes with the first inserted hairpin 10. Accordingly, the second predetermined angle may be set to 315 degrees (7.5 degrees*42).

The guide bar 51 may reciprocate in the radial direction by the first driving unit 55 mounted on the connection bracket 53.

Figure 6:
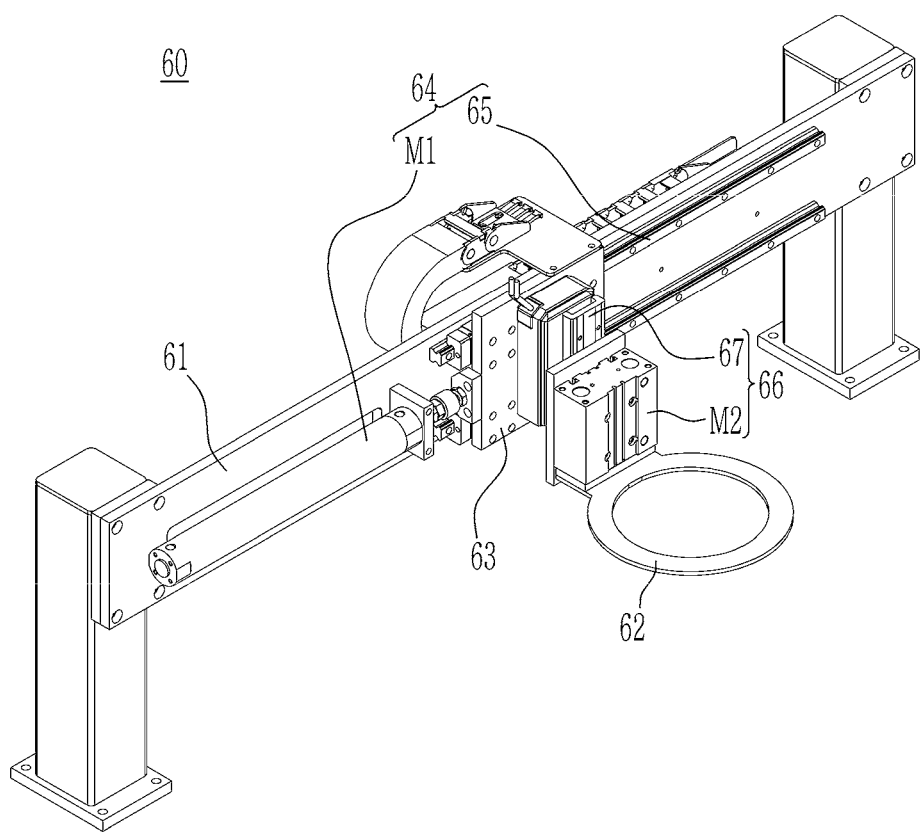
FIG. 6 is a schematic diagram for explaining a pressure unit applied to a hairpin alignment device for a hairpin winding motor according to an embodiment of the present disclosure.

FIG. 6 is a schematic diagram for explaining a pressure unit applied to a hairpin alignment device for a hairpin winding motor according to an embodiment of the present disclosure.

Referring to FIG. 6, in an embodiment of the present disclosure, the pressure unit 60 is disposed on the alignment unit 40. This pressure unit 60 may press the hairpin 10 pre-aligned to the slot 21 of the dummy core downward to be positioned in a home position. The pressure unit 60 includes a frame 61 disposed adjacent to the rotation unit 30, and a pressure plate 62 mounted on the frame 61. The pressure plate 62 is formed in a ring shape of a plate shape. The pressure plate 62 is slidably mounted to the frame 61 by the second driving unit 64. The pressure plate 62 is mounted to the second driving unit 64 through the connection plate 63.

The second driving unit 64 includes a horizontal rail 65 movably inserted into the connection plate 63, and a servo-motor M1 that moves the connection plate 63 to be slidable along the horizontal rail 65. The pressure plate 62 may be moved to the upper center of the slot 21 of the dummy core by the operation of the second driving unit 64. The pressure plate 62 is configured to reciprocate in an up/down direction by a third driving unit 66 mounted on the second driving unit 64. The third driving unit 66 includes a vertical rail 67 mounted on the connection plate 63, and a servo-motor M2 that slides and moves the pressure plate 62 along the vertical rail 67. The pressure plate 62 may press the hairpin 10 inserted into the slot 21 of the dummy core in the downward direction to be positioned in a home position.

Also, an embodiment of the present disclosure may further include a handling gripper 70 disposed adjacent to the rotation unit 30 and inserting the hairpin 10 to the slot 21 of the dummy core (referring to FIG. 2). The handling gripper 70 may be implemented through an articulated robot.

FIG. 7 to FIG. 12 are views sequentially showing a hairpin alignment method for a hairpin winding motor according to an embodiment of the present disclosure.

Hereinafter, a hairpin alignment method for a hairpin winding motor according to an embodiment of the present disclosure is described in detail with reference to accompanying drawings.

Figure 7A:
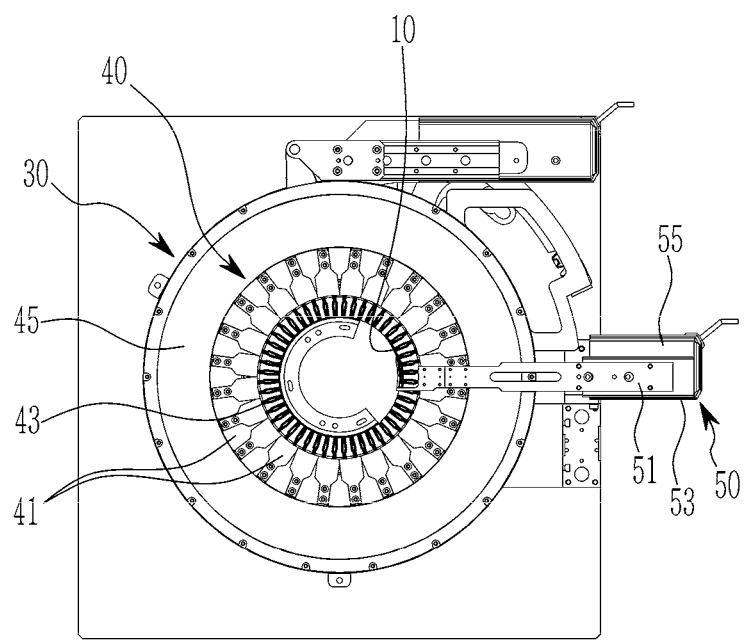
FIGS. 7A, 7B, 8A, 8B, 9, 10, 11, and 12 are views sequentially showing a hairpin alignment method for a hairpin winding motor according to an embodiment of the present disclosure.

First, referring to FIG. 7A, a first step of supplying the hairpin 10 to the slot 21 of the dummy core by the handling gripper 70 is executed. At this time, the handling gripper 70 supplies the hairpin 10 to be inserted into the slot 21 of the dummy core from the top to the bottom by its own weight.

Figure 7B:
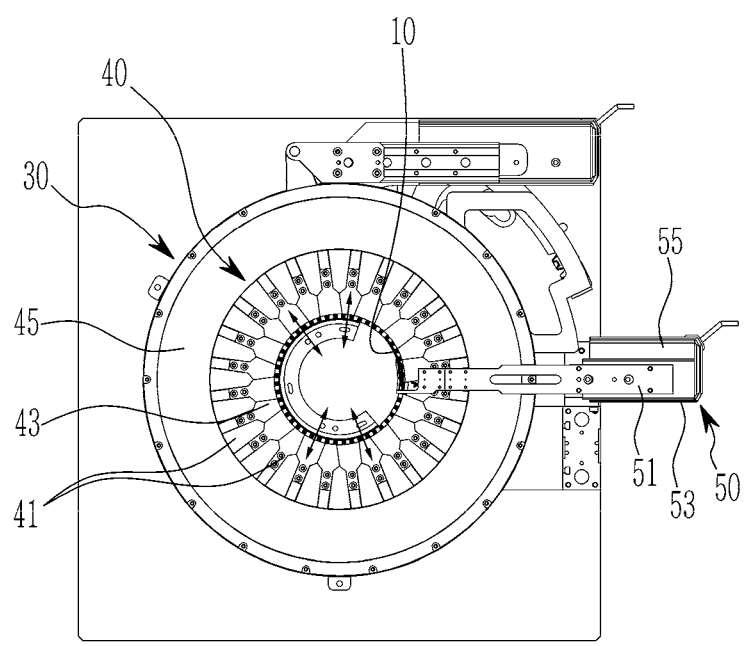

Next, as shown in FIG. 7B, a second step of operating the alignment unit 40 inward in the radial direction to press the hairpin 10 from the inside of the slot 21 of the dummy core toward the center side of the slot 21 of the dummy core is executed. At this time, a plurality of push bars 41 of the alignment unit 40 press the hairpin 10 while simultaneously operating in the radial direction.

Figure 8A:
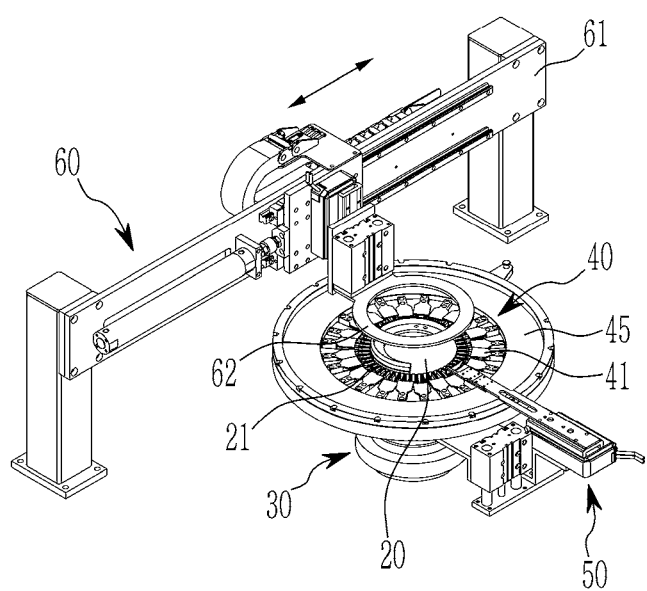

Referring to FIG. 8A, the pressure plate 62 is positioned on the upper center of the dummy core 20. The pressure plate 62 is positioned in a home position on the dummy core 20 by the second driving unit 64 to correspond to the center of the dummy core 20.

Figure 8B:
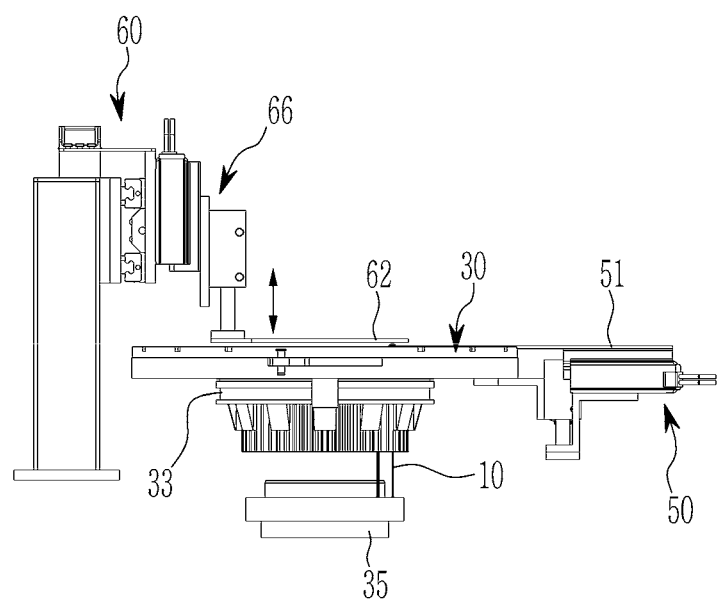

Referring to FIG. 8B, a third step of lowering the pressure plate 62 to press the hairpin 10 downward is executed. While the pressure plate 62 is lowered by the third driving unit 66, the pressure plate 62 presses the upper part of the hairpin 10 downward to position the hairpin 10 in its proper position.

At this time, in the hairpin 10, the lower end of the de-coating part 15 is in contact with the lower contact terminal 39 of the lower plate 35.

Next, according to the shape of slot 21 of the dummy core, the rotation unit 30 rotates the dummy core 20 by the first predetermined angle. And the first to third steps are repeatedly executed.

Figure 9:
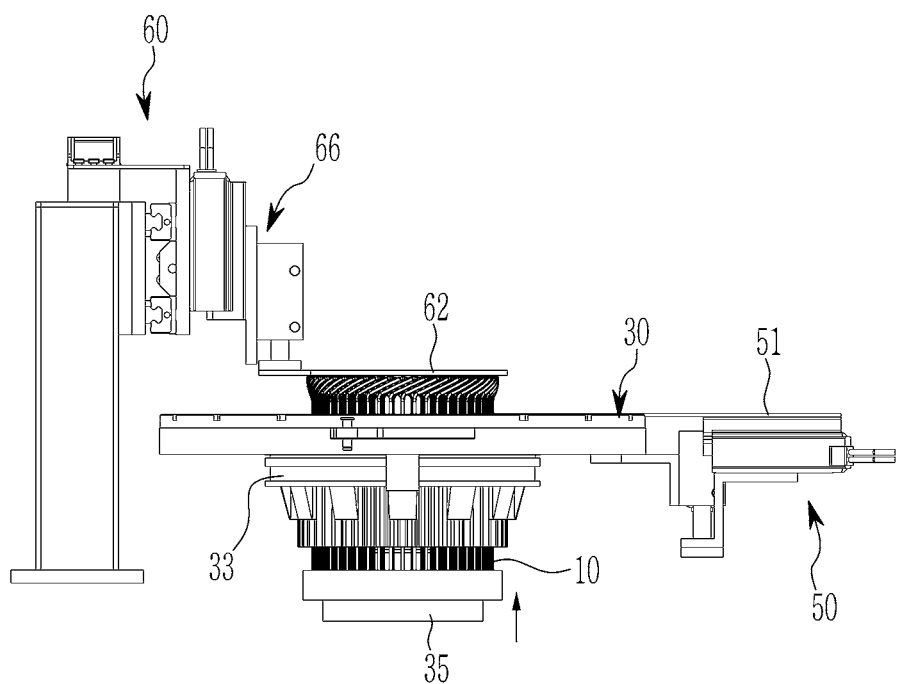

Referring to FIG. 9, the rotation unit 30 is rotated by the second predetermined angle, and the lower plate 35 raises the hairpin 10 from the dummy core 20.

Figure 10:
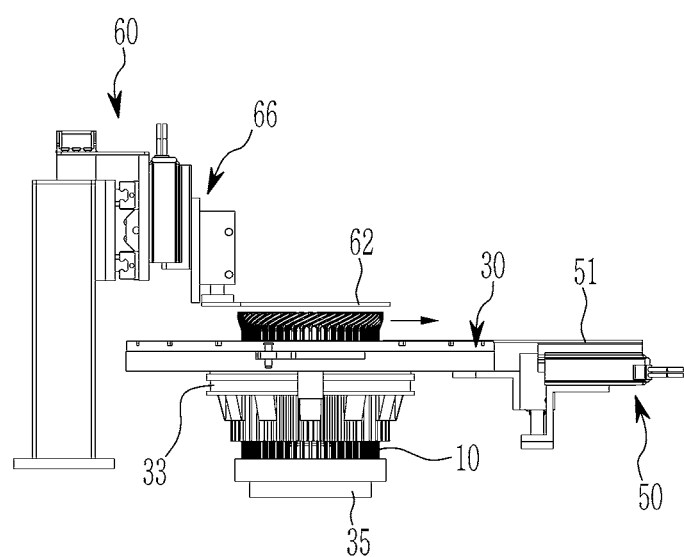

Referring to FIG. 10, then, after the hairpin 10 moves outward in the radial direction through the guide unit 50 to secure the insert space of the hairpin 10 within the slot 21 of the dummy core 20, a fourth step of inserting the next hairpin 10 is executed.

More specifically, in the fourth step, the alignment unit 40, the guide unit 50, and the dummy core 20 are rotated by the first predetermined angle according to the number of slots 21 of the dummy core by the rotation jig 31 of the rotation unit 30.

Figure 11:
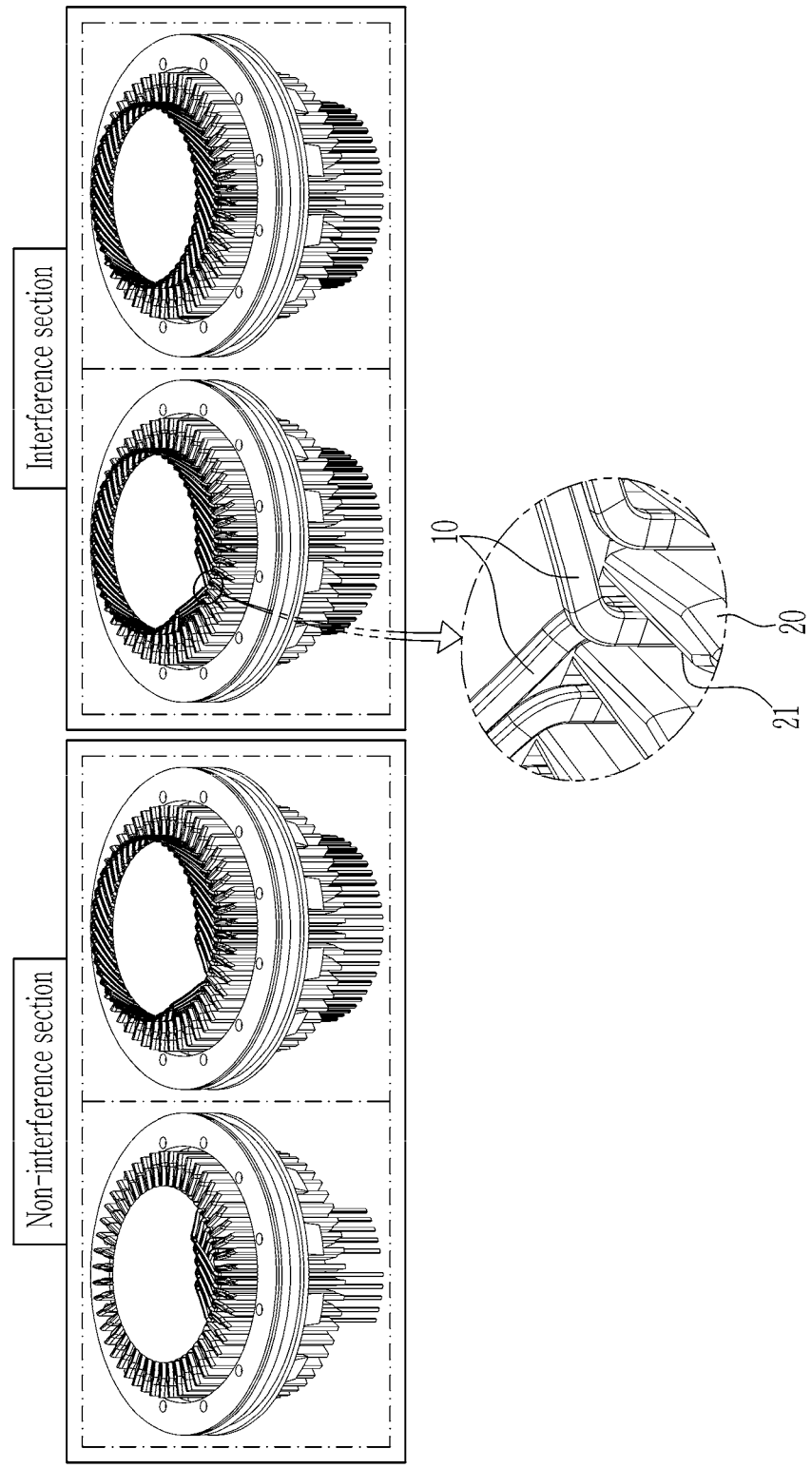

Referring to FIG. 11, the second predetermined angle may be defined as the rotation angle until the currently inserted hairpin 10 interferes with the first inserted hairpin 10 when the hairpin 10 is inserted into the slot 21 of the dummy core along the circumference of the dummy core 20.

That is, a series process of inserting the first hairpin 10 into the slot 21 of the dummy core, rotating the dummy core 20 by the first predetermined angle by the rotation unit 30, and then inserting the second hairpin 10 into the slot 21 of the dummy core is repeated.

The hairpin 10 is sequentially inserted into the slot 21 of the dummy core along the circumference of the dummy core 20, if the hairpin 10 is inserted while rotating the dummy core 20 by a certain amount (a non-interference section), a section in which the hairpin 10 is interfered with inevitably occurs (an interference section).

The second predetermined angle may be defined as an angle at which the dummy core 20 rotates until the currently inserted hairpin 10 interferes with the first inserted hairpin 10.

Also, as the guide bar 51 moves the upper part of the raised hairpin 10 outward in the radial direction, it is possible to secure the insert space between the adjacent hairpins 10. The hairpin 10 may be pre-aligned with as many layers as necessary without the interference between hairpins 10 in the insert space formed in this way.

Figure 12:
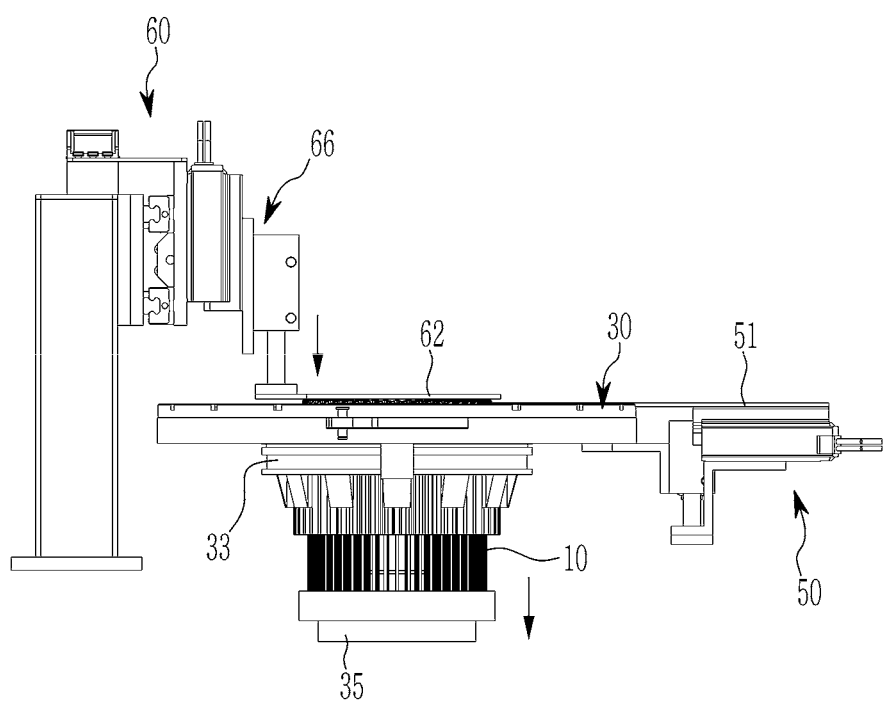

Referring to FIG. 12, finally, the pressure plate 62 descends to press the hairpin 10 downward, and the lower plate 35 also returns to its initial state.

Further, after the hairpin 10 is pre-aligned to the dummy core 20, the process of clamping the pre-aligned hairpins 10 to the dummy core 20 at once to be inserted into the stator core 3 of the hairpin winding motor is executed.

Therefore, the hairpin alignment device and method according to an embodiment of the present disclosure may respond regardless of the type of the stator core 3 and the hairpin 10, thereby reducing the initial design cost.

In addition, the hairpin alignment device according to an embodiment of the present disclosure provide the insert space within the slot 21 of the dummy core by the guide unit 50, thereby aligning the hairpin 10 without the interference.

Accordingly, the hairpin alignment device may reduce the overall cycle time and increase accuracy.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

The invention claimed is:

1. A hairpin alignment method for pre-aligning a plurality of hairpins of a hairpin winding motor configured to be inserted into a slot of the hairpin winding motor, the method comprising:
   supplying a first hairpin to a slot of a dummy core by a handling gripper;
   operating an alignment unit inward in a radial direction to press the first hairpin toward a center side of the slot of the dummy core;
   pressing the first hairpin downward by lowering a pressure plate;
   rotating the dummy core by a first predetermined angle depending on the number of slots of the dummy core through a rotation unit, and sequentially repeating the supplying, the operating, and the pressing steps with a second hairpin;
   creating an insert space by moving the first hairpin outward in the radial direction by a guide unit, and moving the second hairpin outward in the radial direction by the guide unit when the rotation unit rotates by a second predetermined angle; and
   inserting a third hairpin into the slot after the insert space is created;
   wherein pressing the first hairpin includes the pressure plate being positioned in a home position corresponding to the center of the dummy core by a first driving unit, and an upper part of the first hairpin being pressed downward while being lowered by a second driving unit.

2. The hairpin alignment method for the winding motor of claim 1, wherein supplying comprises the handling gripper supplying the first hairpin to be inserted into the slot of the dummy core.

3. The hairpin alignment method for the winding motor of claim 1, wherein operating the alignment unit includes a plurality of push bars of the alignment unit pressing the first hairpin.

4. The hairpin alignment method for the winding motor of claim 1, wherein rotating the dummy core includes the alignment unit, a guide unit, and the dummy core rotating by the first predetermined angle according to the number of slots by a rotation jig.

5. The hairpin alignment method for the winding motor of claim 1, wherein the second predetermined angle in rotating the dummy core is an angle at which the dummy core rotates until a further hairpin being inserted interferes with the first hairpin when inserting the further hairpin into the slot along the circumference of the dummy core.

6. The hairpin alignment method for the winding motor of claim 5, wherein the rotating includes:
   raising the hairpin from the dummy core through the lower plate when the dummy core is rotated by the second predetermined angle by the rotation unit; and
   securing an inserting space between the adjacent hairpins by pulling the upper part of the raised hairpin with a guide bar outward in the radial direction.

7. The hairpin alignment method for the winding motor of claim 5, further comprising after rotating the dummy core, clamping pre-aligned hairpins to the dummy core at once to be inserted into the hairpin winding motor.

* * * * *